Nov. 21, 1944.  J. B. SINNER ET AL  2,363,156
FASTENER FOR CRYPT FRONTS
Filed June 22, 1943   3 Sheets-Sheet 1

Inventors
John B. Sinner
Oscar A. Sinner

By Clarence A. O'Brien
and Harvey B. Jacobson
Attorneys

Nov. 21, 1944.　　　J. B. SINNER ET AL　　　2,363,156
FASTENER FOR CRYPT FRONTS
Filed June 22, 1943　　　3 Sheets-Sheet 2
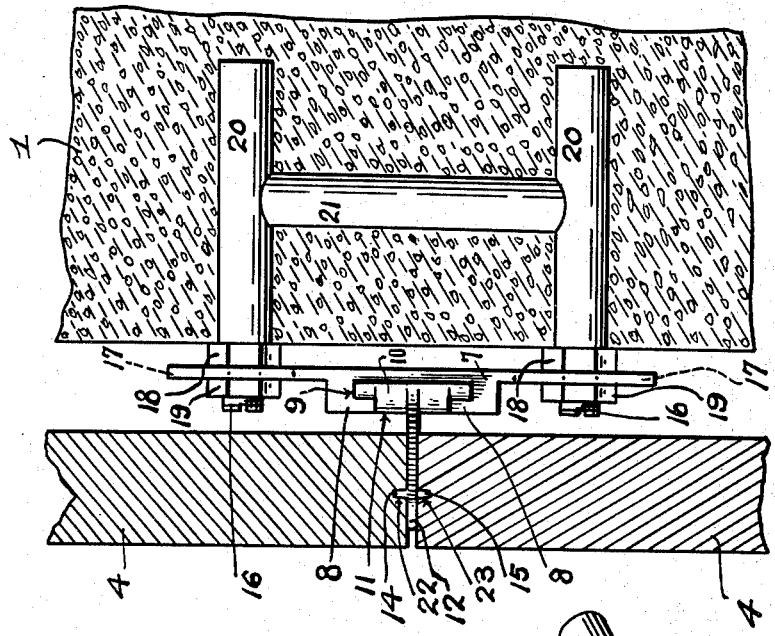
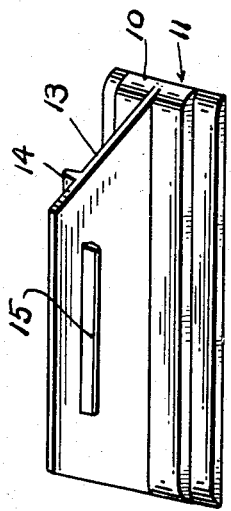
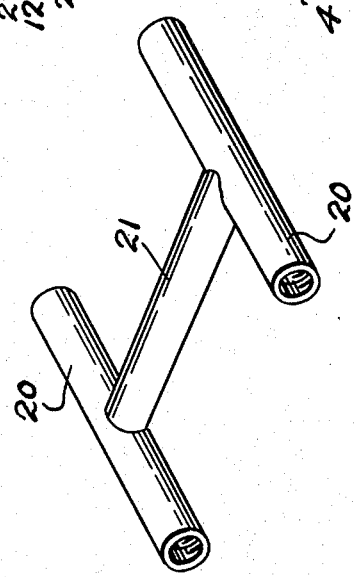
Inventors
John B. Sinner
Oscar A. Sinner
By Clarence A. O'Brien
and Harvey B. Jacobson
Attorneys Nov. 21, 1944.  J. B. SINNER ET AL  2,363,156
FASTENER FOR CRYPT FRONTS
Filed June 22, 1943   3 Sheets-Sheet 3
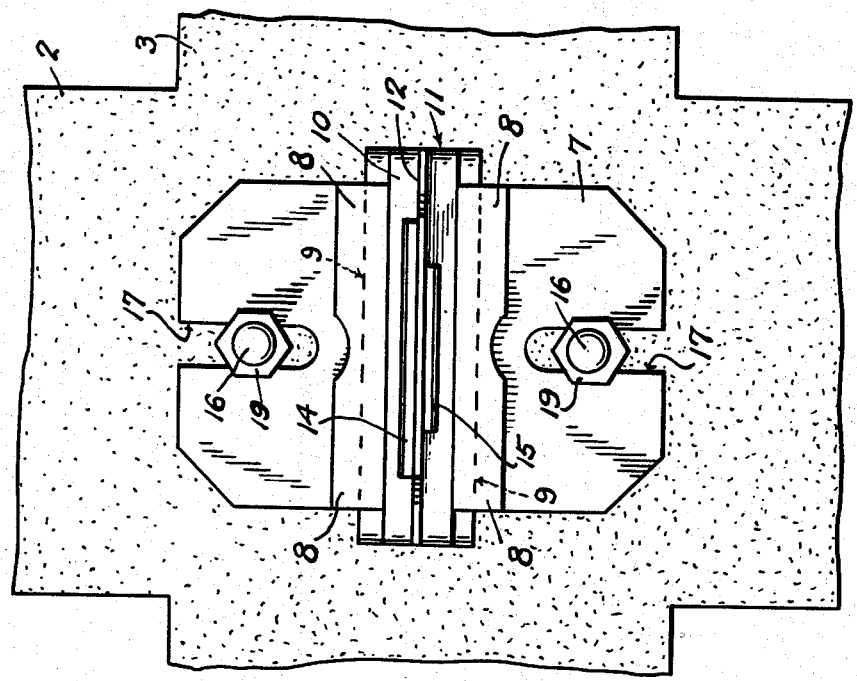
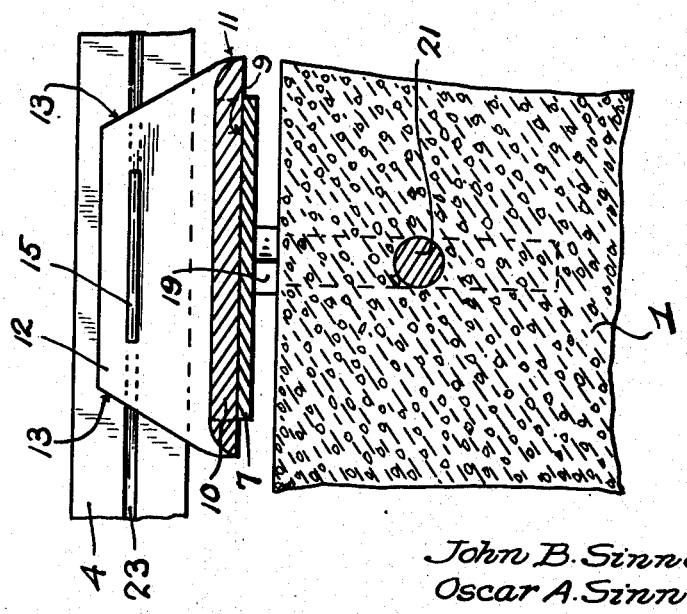
Inventors
John B. Sinner
Oscar A. Sinner
By Clarence A. O'Brien
and Harvey B. Jacobson
Attorneys Patented Nov. 21, 1944

2,363,156

UNITED STATES PATENT OFFICE 2,363,156

FASTENER FOR CRYPT FRONTS

John B. Sinner and Oscar A. Sinner, San Diego, Calif.

Application June 22, 1943, Serial No. 491,820

1 Claim. (Cl. 72—7)

Our invention relates to fasteners for securing the marble fronts of crypts in place.

The instant invention is designed as an improvement over that forming the subject matter of U. S. Patent No. 2,080,190 issued to John B. Sinner, under date of May 11, 1937, the primary object in view being to provide simplified fasteners for use at the corners of crypt fronts arranged in horizontal and vertical rows, and which are constructed and arranged for releasing the corners of any selected front without releasing or unfastening surrounding fronts, whereby any selected front may be quickly and easily removed to open a selected crypt compartment.

Another object is to obviate in such fasteners the use of springs for maintaining fronts of different thicknesses facing in a common plane.

Still another object is to provide in such fasteners improved means for permanently anchoring the same in the crypt structure.

Other and subordinate objects are also comprehended by our invention, all of which, together with the precise nature of our improvements will be readily understood when the succeeding description and claim are read with reference to the drawings accompanying and forming part of this specification.

Figure 1:
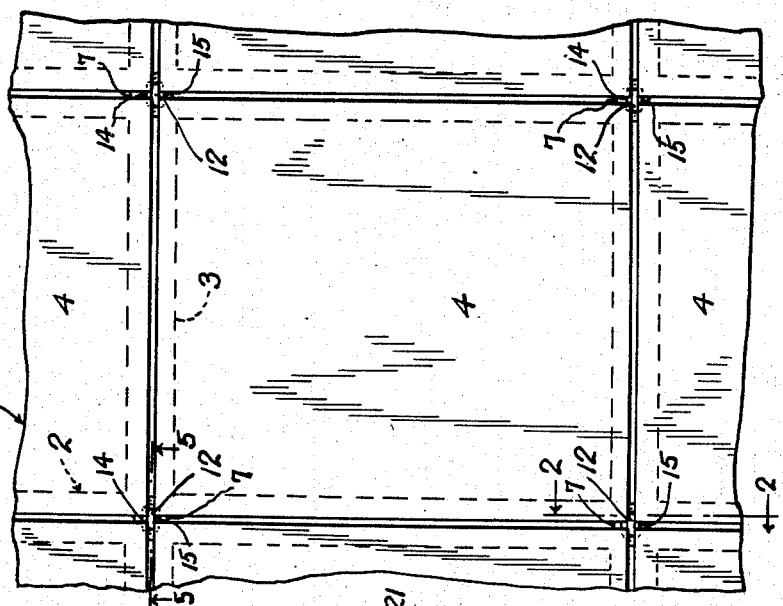
Figure 2:
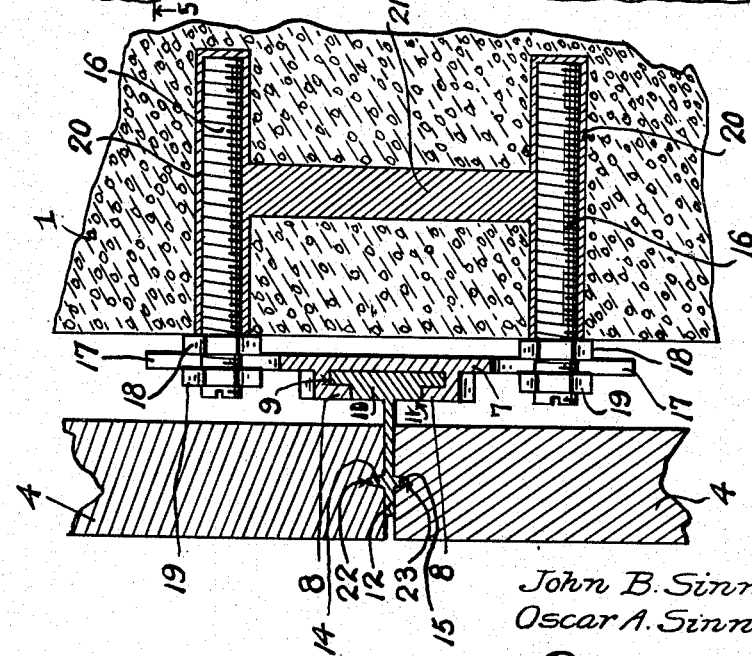

In said drawings:

Figure 1 is a view in front elevation of a portion of a crypt with the fronts secured in place by means of our improved fasteners, Figure 2 is a view in vertical section taken on the line 2—2 of Figure 1 and drawn to an enlarged scale, Figure 3 is a similar view with the fasteners shown in elevation, Figure 4 is a view in front elevation of one of the fasteners anchored to the crypt, Figure 5 is a view in horizontal section taken on the line 5—5 of Figure 1, Figure 6 is a view in perspective of one of the slides, and Figure 7 is a similar view of the anchoring device for the studs of the fasteners.

Referring to the drawings by numerals, our improved fasteners have been shown therein as applied to the usual crypt, or mausoleum, 1 having intersecting, horizontal and vertical partition walls, shown in dotted lines at 2, 3, respectively, and forming casket containing compartments 5, as will be understood, adapted to be closed by square fronts, or slabs, 4 arranged in horizontal and vertical rows. The fasteners, designated 6, are provided at the intersections of the vertical and horizontal partition walls 2, 3, as best shown in Figure 1.

Each fastener 6 comprises a base plate 7 embodying on the front face thereof a pair of vertically spaced, horizontal guides 8 forming a horizontal dovetailed guideway 9 therebetween in which is slidably mounted a rectangular dovetailed plate 10 forming the base of a slide 11 and which is provided with a central outstanding ledge 12 having beveled ends 13 for a purpose presently seen. The ledge 12 is provided on the top face thereof with a rib-like key 14 extending along the same from end to end thereof, and on the bottom face with a similar key 15 shorter than the key 14 and terminating short of the ends of the ledge 12.

The fasteners 6 are each secured to the crypt 1 by means of a pair of upper and lower studs 16, the front ends of which extend through upper and lower slots 17 in the base plate 7, the studs being provided in the rear of said base plate with polygonal heads 18 designed to abut the crypt 1 and against which the base plate is clamped by nuts 19 on said front ends turned against said plate. By this means, the base plate 7 and slide 11 are vertically adjustable, as occasion may require, on the crypt 1. The studs 16 are turned into a pair of internally threaded bushings 20 embedded in the crypt structure 1 and connected intermediate their ends by a cross rod 21 extending endwise therebetween and also embedded in said structure. As will be seen, the bushings 20 and the rod 21 form a durable device for anchoring the fastener in said crypt structure.

The ledges 12 of the fasteners 6 are interposed horizontally between the top and bottom edges of adjacent horizontal rows of fronts 4 at the corners of said fronts, and each ledge 12 supports the adjacent lower corners of two adjacent fronts 4 of a horizontal row and overlies the upper corners of two adjacent fronts 4 of a subjacent horizontal row vertically aligned with the two fronts of the first mentioned row, and with the upper key 14 slidably fitted in horizontal bottom edge grooves 22 in the two first mentioned fronts, and the lower, shorter key 15 similarly fitted in longitudinal, lower edge grooves 23 in the two last mentioned fronts. The grooves 22, 23 may be so located in the fronts 4 that the outer faces of the fronts 4 are arranged in a common plane regardless of the thickness of the fronts.

By virtue of the described construction and arrangement of the fasteners 6, relative to the fronts 4, if removal of any selected front 4 is desired, the top edge thereof may be unfastened by merely moving the slide 11 of the fastener 6 at the upper left corner toward the left, as viewed in Figure 1, sufficiently to withdraw the lower key 15 from the upper edge groove 22 of the selected front without withdrawing the longer key 14 from the lower edge groove 23 of the next higher front 4 in the same vertical row, and also moving the slide 11 of the fastener 6 at the right hand upper corner of the selected front toward the right, in a similar manner. Thus the upper edge of the selected front 4 is unfastened and said front may be tilted outwardly on the ledges 12 of the fasteners 6 at its lower corners and then lifted off the last mentioned fasteners. As will be apparent, by moving the two slides 11, in the manner specified, the keys 14, 15 slide in the grooves 22, 23 of the fronts 4 in the vertical rows upon each side of the selected front and without unfastening the adjacent corners of the fronts in said side rows, or, the corners of the fronts 4 immediately above the selected one. Thus, any selected front 4 may be removed without unfastening other fronts. The beveled ends 13 of the ledges 12 facilitate sliding movement of the slides 11 between the edges of the fronts 4, as will now be seen.

The foregoing will, it is believed, suffice to impart a clear understanding of our invention without further explanation.

Manifestly the invention, as described, is susceptible of modification without departing from the inventive concept, and right is herein reserved to such modifications as fall within the scope of the appended claim.

What we claim is:

The combination with a crypt, and pairs of side by side upper and lower front slabs therefor having adjacent corners grouped around a common center, of a fastener for said fronts comprising an elongated plate extending lengthwise horizontally behind said corners, means to anchor said plate to said crypt, an elongated member slidably mounted on said plate for endwise adjustment along the same and provided with a forwardly projecting horizontal ledge slidably interposed between the corners of the upper and lower pair of fronts, and coacting devices on said ledge and edges of said corners slidably interlocking the ledge with said corners, said devices comprising upper and lower rib-like keys on said ledge, and grooves in said edges forming keyways, one of the keys being shorter than the other so that under sliding of said ledge said shorter key may be withdrawn from the groove in the edge of one slab to release the corner of said slab while the keys remain interlocked with the grooves in the edges of the corners of the other slabs.

JOHN B. SINNER.
OSCAR A. SINNER.